Oct. 23, 1934.  S. H. SIEFF ET AL  1,978,376
APPARATUS FOR USE IN THE MANUFACTURE OF BADMINTON AND LIKE SHUTTLECOCKS
Filed Nov. 19, 1932   8 Sheets-Sheet 1

INVENTORS.
S.H.SIEFF.
G.W.BATTLE.
By
Blair Kilcoyne
ATTYS.

Oct. 23, 1934.   S. H. SIEFF ET AL   1,978,376
APPARATUS FOR USE IN THE MANUFACTURE OF BADMINTON AND LIKE SHUTTLECOCKS
Filed Nov. 19, 1932   8 Sheets-Sheet 3

INVENTORS.
S. H. SIEFF.
G. W. BATTLE.
By Blair Kilcoyne
ATTYS.

Oct. 23, 1934.  S. H. SIEFF ET AL  1,978,376
APPARATUS FOR USE IN THE MANUFACTURE OF BADMINTON AND LIKE SHUTTLECOCKS
Filed Nov. 19, 1932  8 Sheets-Sheet 4
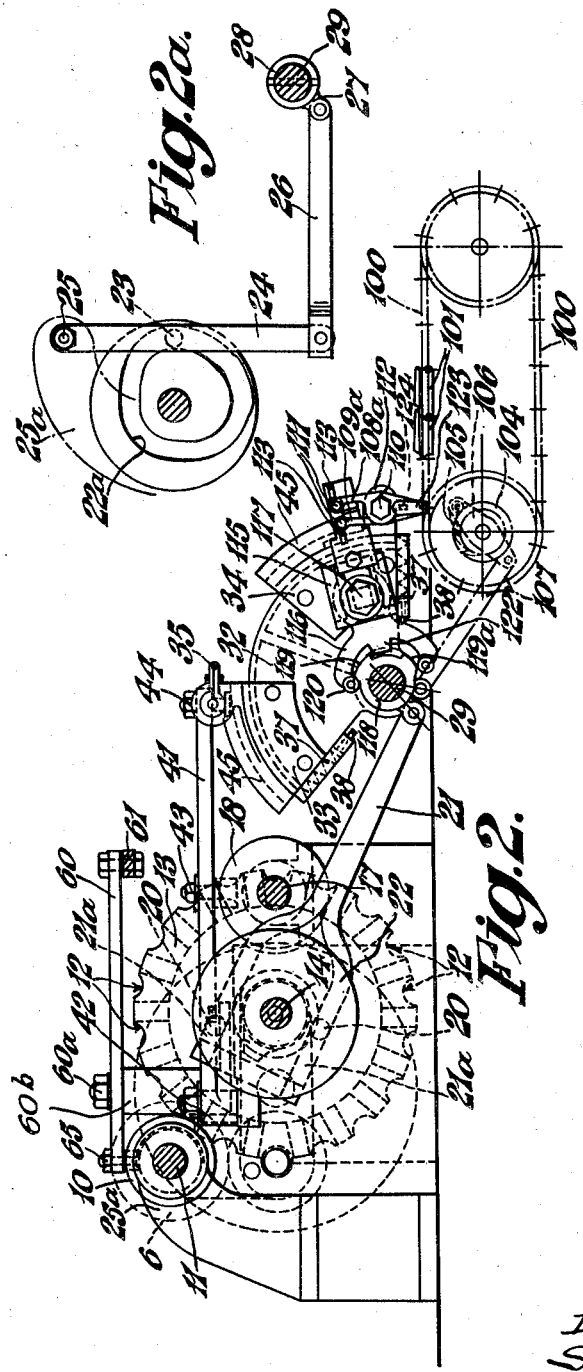
INVENTORS,
S. H. SIEFF.
G. W. BATTLE.
By
ATTYS.

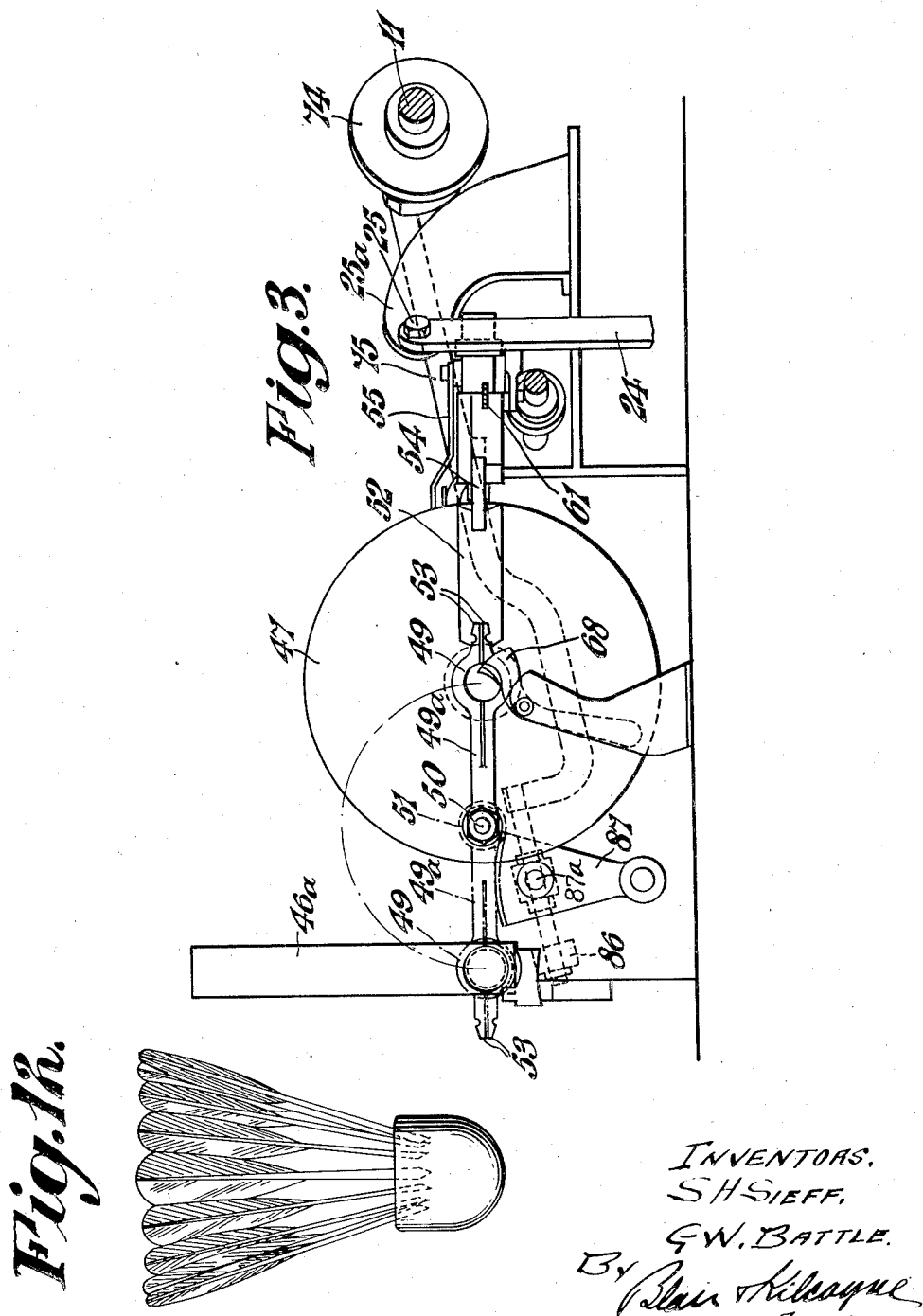

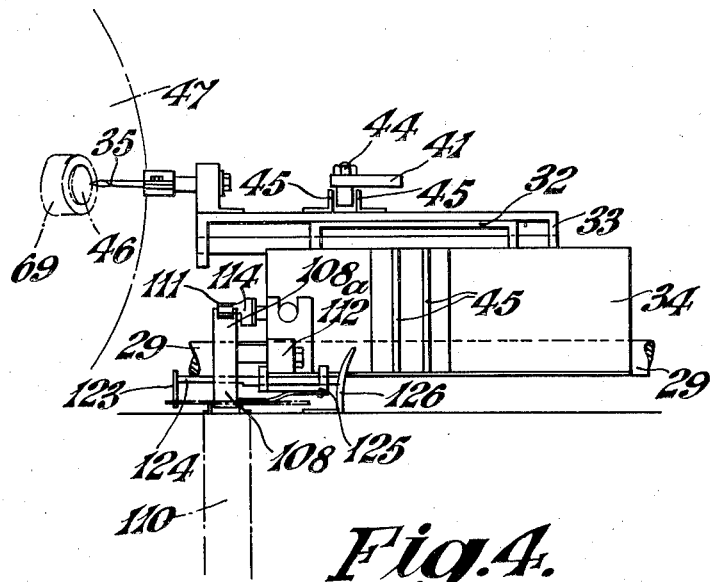
Fig.4.
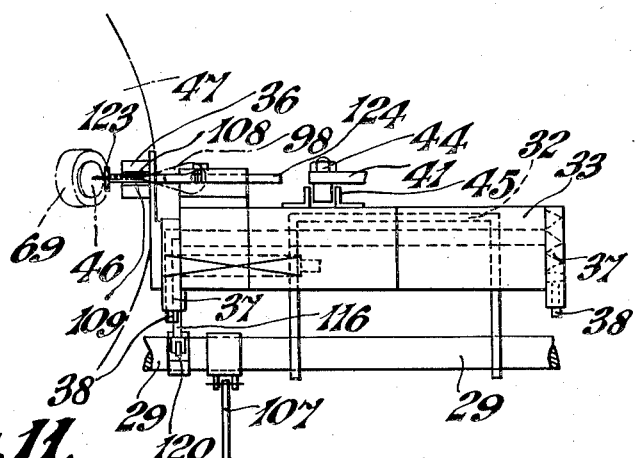
Fig.11.    Fig.5.
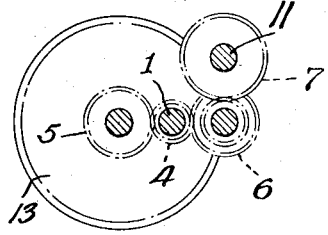
INVENTORS,
S. H. SIEFF.
G. W. BATTLE.
BY
ATTYS.

Inventors,
S. H. Sieff.
G. W. Battle.
By
Attys.

Patented Oct. 23, 1934

1,978,376

UNITED STATES PATENT OFFICE 1,978,376

APPARATUS FOR USE IN THE MANUFACTURE OF BADMINTON AND LIKE SHUTTLECOCKS

Solomon Hirsh Sieff and George William Battle, London, England

Application November 19, 1932, Serial No. 643,504
In Great Britain December 1, 1931

6 Claims. (Cl. 144—3)

This invention relates to apparatus for use in the manufacture of badminton and like shuttlecocks.

By present methods shuttlecocks are made almost entirely by hand. This involves tasks requiring much skill and dexterity especially in the operation of piercing the bases and inserting the customary feathers. Even with highly skilled operators it is not usually possible for any one operator to exceed an average output of six articles in an hour. In addition, however skilled the operator, it is almost impossible to attain exact precision in the spacing and angular disposition of the inserted feathers.

The object of the present invention is to devise an apparatus which will effect the operation of inserting the feathers, and also, if desired, the operation of piercing the base mechanically with a degree of rapidity and precision quite impossible of attainment by the old manual method.

Broadly the present invention consists of apparatus for use in the manufacture of badminton and like shuttlecocks in which the operation of inserting the feathers in the shuttlecock bases is effected mechanically.

The invention also includes an apparatus in which the operation of forming spaced feather receiving holes in the shuttlecock bases is a further function thereof additional to that of inserting the feathers. If desired, however, the piercing operation may be effected by hand, but in practice we prefer to use a machine in which the two operations of piercing and inserting the feathers are performed mechanically and automatically.

In one form of apparatus according to this invention the preformed shuttlecock bases are adapted to be fed or conveyed one at a time to what may be termed a spacing head. This head comprises a rotatable member disposed with its axis at a predetermined oblique angle corresponding to the angularity of the holes to be formed in said bases and means for gripping and holding the shuttlecock bases singly in position on said member. By suitable means hereafter to be described this head is revolved with an intermittent motion the rotary motion being interrupted a predetermined number of times during each revolution corrresponding to the number of holes to be pierced and feathers inserted and held by locking means during each piercing and feather inserting operation.

The piercing of each shuttlecock base is effected by a sharp pointed instrument which is carried by a reciprocating slide or its equivalent which in turn is carried by a rocking member or quadrant which also carries a further slide having at its inner end a pair of grippers or the like for singly engaging the feathers to be inserted. At each pause in the intermittent motion of the head carrying the shutttlecock base the piercing instrument is moved forward by its slide to effect the piercing of a hole. The rocking member or quadrant then turns through a suitable angular distance so as to bring the feather grippers and an engaged feather into line with the pierced hole. The feather thus positioned is then inserted, stem first, into the previously formed and aligned hole in the shuttlecock base by suitable movement of its slide.

Upon completion of these operations the rocking member or quadrant turns back to its original position, the shuttlecock base carrying head moves around a further step and the piercing and feather inserting operations are repeated. These operations continue until the required number of feathers have been inserted when the means holding the completed shuttlecock base is moved to a position opposite means for inserting a fresh base. The insertion of a fresh base may conveniently be used to effect the discharge of each completed base.

The feathers are fed into a position for engagement by the aforesaid grippers by means of a travelling band or conveyor which is moved with an intermittent motion such as to cause a fresh feather to be brought into the picking up position each time a feather is removed for insertion. For this purpose the feathers are laid in predetermined spaced relationship upon the travelling band or conveyor either mechanically or by an operator.

In order that the invention may be understood and carried into effect such an embodiment of the same will now be described by aid of the accompanying drawings in which:—

Fig. 1b is a similar view of only those parts which receive their motion from shaft 11.

Figure 2 is a part section on the line A—A of Figure 1.

Figure 2a is an enlarged side elevation of a detail hereafter to be described.

Figure 3 is a part section on the line B—B of Figure 1.

Figure 4 is a view showing the piercing awl at the commencement of a piercing stroke.

Figure 5 is a similar view showing a feather gripper about to insert a feather stem into the hole formed by the operation illustrated in Figure 4.

Figure 11 is a sectional view taken in a plane immediately to the right of wheel 7, Figure 1.

Figure 12 is a view of the finished product.

Figure 1:
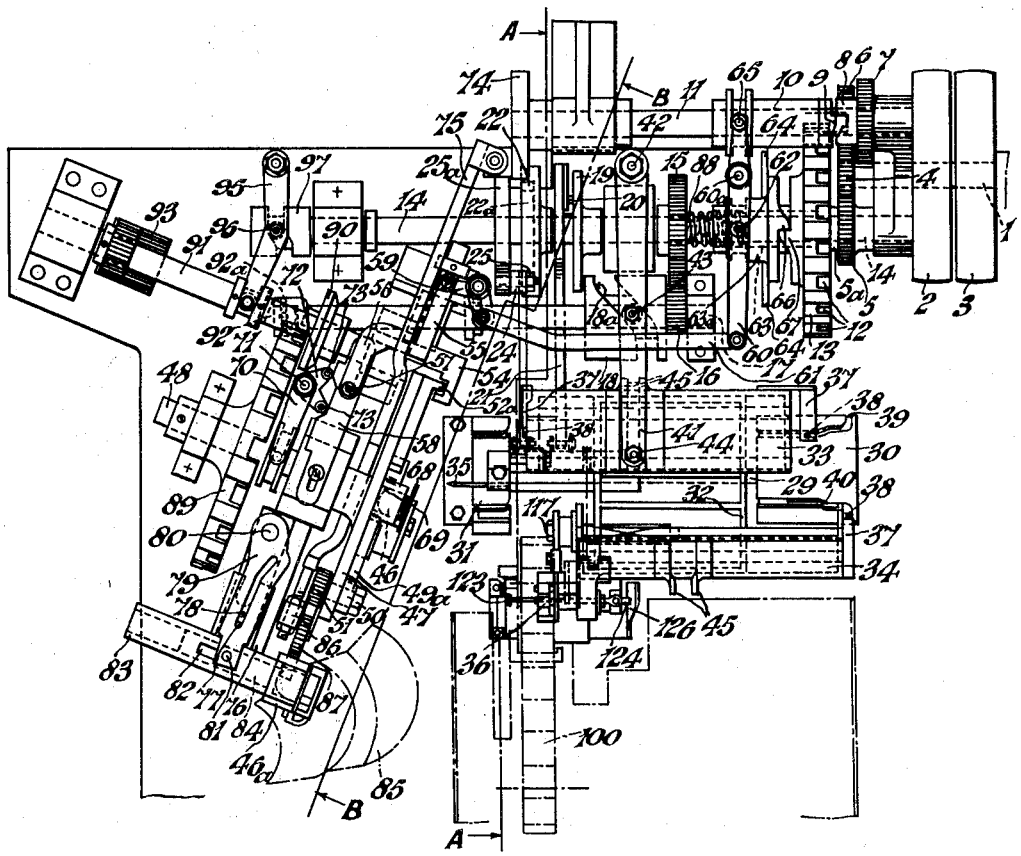
Figure 1 is a plan view of the complete machine.
Figure 1A:
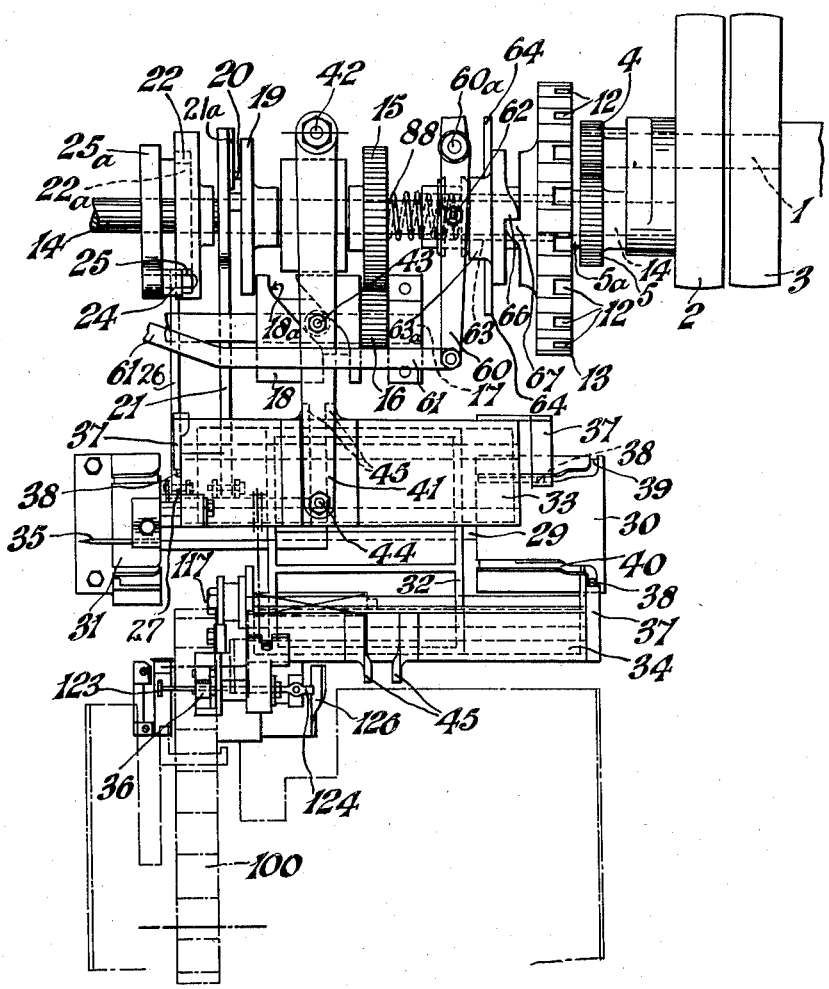
Fig. 1a is a plan view of certain parts in Fig. 1, driven by the shaft 14.
Figure 16:
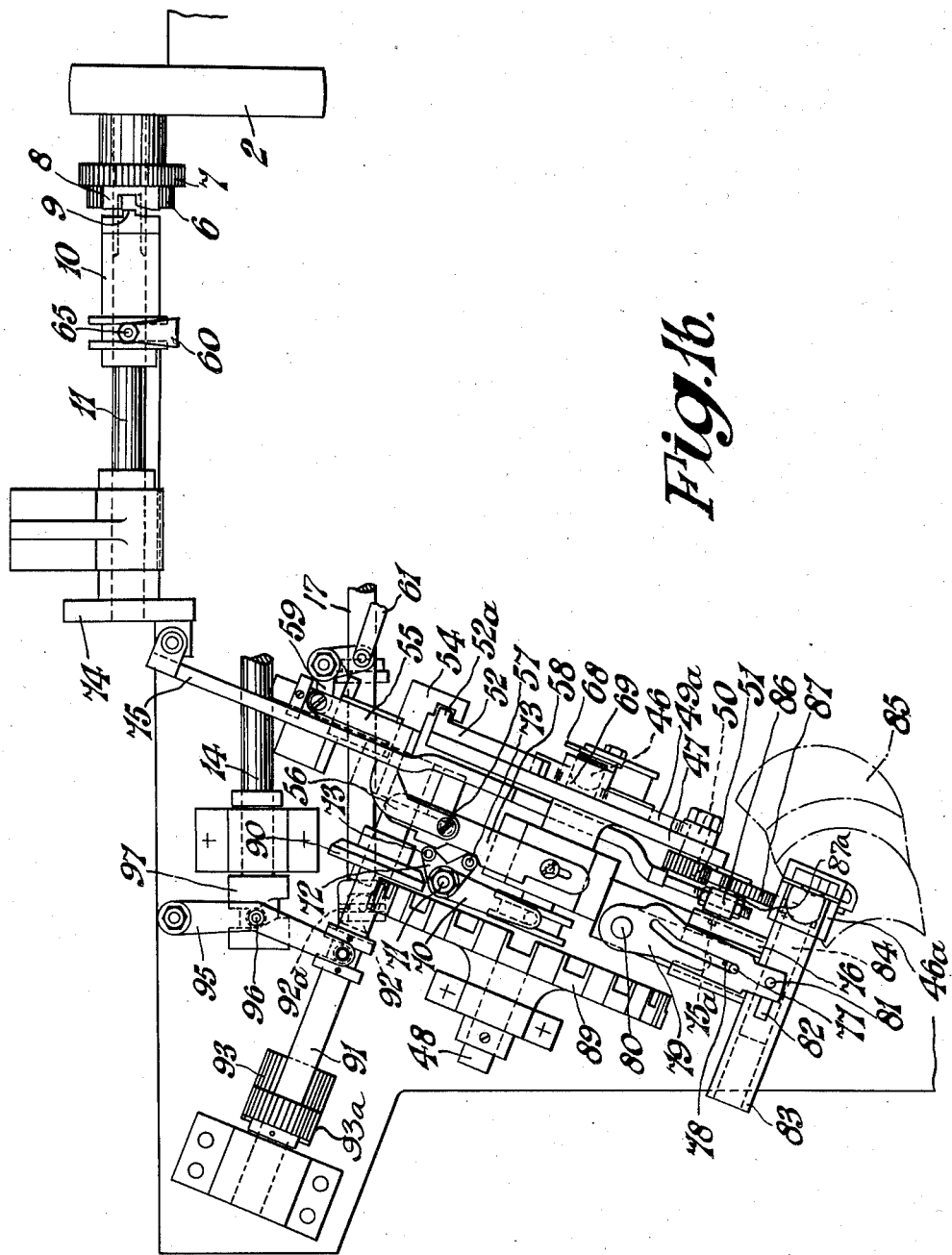

Referring to the drawings, the machine illustrated comprises a main driving shaft 1 carrying on its outer end fast and loose pulleys 2 and 3 respectively, and on its inner end a small driving pinion 4. This driving pinion meshes simultaneously with a toothed wheel 5 carried on the sleeve 5b on shaft 14 and a further toothed wheel 6 which is mounted upon a small stub shaft shown in Fig. 11. This stub shaft carries a pin wheel not shown and a further driving pinion which meshes with a toothed wheel 7 forming the female half 8 of a dog clutch, the male half 9 thereof forming part of a sleeve 10 which is slidably mounted upon a shaft 11, a driving connection therebetween being afforded by splines or feathers.

The pin wheel abovementioned is, through the aforesaid driving gear, rotated with a continuous motion and in its rotation the driving pin carried thereby engages in turn in each of the slots 12 in a castellated or Geneva wheel 13 mounted on the shaft 14 and forming coacting part of the dog clutch 5a. The motion of the toothed wheel 5 is imparted to a shaft 14 by means of a dog clutch 5a which is in engagement when the other dog clutch abovementioned is out of engagement and vice-versa. Upon this shaft 14 is secured a toothed wheel 15, which meshes with a pinion 16 carried by a shaft 17 upon which is also mounted a grooved cam 18. Similarly mounted upon the shaft 14 and so as to be rotatable therewith, and in advance of the toothed wheel 15, is a further pin wheel 19 which carries projecting from its outer face, a pair of pins 20, see Figs. 1 and 2. These pins are adapted to engage with the forked end 21a of a connecting link 21. In advance of this forked connecting link 21 and similarly mounted on the shaft 14 is a grooved face cam 22, see Figs. 1 and 2a, with the groove 22a of which is adapted to co-act a pin or roller 23 mounted intermediate the length of a swinging link 24 such link being suspended from a fulcrum point 25 supported by a bracket 25a. The lower end of this swinging link 24 is connected by a further link 26 to an off-set pin 27 forming part of a boss 28 which is mounted upon and secured to a shaft 29. This shaft 29 which is supported at one end in a fixed cam plate 30 and at the opposite end by a suitable pedestal bearing 31 serves as a support for a rocking member or quadrant 32 to which it is rigidly attached so that it receives a rocking motion from the shaft 29 which motion in turn is imparted to said shaft by the rotation of the face cam 22 and the attendant connections 24 and 26.

Mounted on the rocking member or quadrant 32 and so as to be free to slide independently thereof and of each other, are a pair of carriers 33 and 34 respectively, the carrier 33 having mounted on it the piercing awl 35, and the carrier 34 having mounted on it the feather gripping device indicated generally at 36.

Mounted upon the outer ends of each carrier (Figure 5) and rigidly attached thereto is a bracket 37 each carrying a spring pressed guide pin one of which is indicated at 38. These spring pressed guide pins are adapted to engage alternately in cam grooves 39 and 40 respectively formed in the face of the cam plate 30 and for a purpose hereafter to be mentioned.

Each carrier 33 and 34 is reciprocated longitudinally and in alternation, the movement of the carrier 33 to effect a piercing operation on a positioned shuttlecock base blank and the movement of the carrier 34 to insert the stem of a feather into the pierced aperture. This motion is imparted, in the present example, by means of an arm 41 which is fulcrumed at 42, the necessary rocking motion being imparted thereto by means of the cam 18 the cam groove 18a of which is engaged by a pin or roller 43 depending from the under side of and intermediate the length of the arm 41. A similar roller 44 is carried by the outer or free end of the arm 41 and this is adapted to engage in turn with parallel guides 45 on each carrier 33 and 34. Such engagement between the pin or roller 44 and the respective guides 45 is brought about in consequence of the co-ordinated motions of the arm 41 and the carriers 33 and 34.

The shuttlecock bases which are to be pierced, one of which is indicated at 46, are adapted to be fed from a hopper 46a, one at a time to a spacing head 47. This spacing head is in the form of a circular face plate and mounted upon one end of a shaft 48, the whole being disposed so that its axis is at a predetermined oblique angle corresponding to the angularity of the holes to be formed in said bases.

The base being operated upon is held centrally of the spacing head within a split chuck 49 formed on the outer end of an arm 49a, the inner end of said arm being rigidly mounted upon a small stub shaft 50. This stub shaft has a bearing in the spacing head and is provided at its inner end with a small toothed pinion 51, see Figs. 1, 1b and 3. Each shuttlecock base is clamped within the split chuck by means of a locking bar 52 which is mounted to slide radially across the face of the spacing head and, in the locking position, to engage over prongs 53 on the chuck. The outer end of the locking bar is formed with a projection 52a which is engaged by a member 54 forming part of or attached to a sliding member 55. Similarly attached to the sliding member 55 is an arm 56 which is connected at 57 to a sliding cam plate 58.

The required motion is imparted to the sliding member 55 by means comprising a bell crank lever 59, a pivoted lever 60 and a connecting rod 61. The lever 60 is pivoted at 60a on a pivot pin 60b fixed to the frame of the machine, the lever 60 being provided intermediate its length with a depending pin or roller 62 which engages in a circumferential groove in the boss of a sleeve 63 upon which is loosely mounted a cam 63a which is prevented from rotating by depending supporting arms 64. On the opposite end of the lever 60 is a further depending pin or roller 65 which engages in a grooved collar forming part of the sleeve 10. Thus when the lever 60 is turned about its fulcrum 60a the lower end of the lever will effect retraction of the locking bar 52, whilst the opposite end of the lever will move the sleeve 10 to bring the male portion 9 of the dog clutch into engagement with the corresponding female portion 8, thus providing a drive connection between the toothed wheel 7 and the shaft 11 which is consequently rotated for a purpose hereafter to be described. The movement of the lever 60 is effected by interengagement between projections 66 and 67 on the face cam 63a and the opposing boss of the Geneva wheel 13 respectively. This displacement of the cam 63a and the consequent movement of the lever 60 only occurs at the completion of the piercing and feather inserting operations on each positioned shuttlecock base.

To ensure that each shuttlecock base shall project the same distance from the face of its retaining chuck a stop 68 is provided against which each positioned shuttlecock base is pushed prior to the chuck being locked by a plunger 69. This plunger is operated by a lever 70, the pivot pin of which is indicated at 71. Mounted upon and movable with this pivot pin is a bell crank lever 72, the extremities of the arms of which are provided with rollers 73. These rollers bear against the profiled edge of the sliding plate 58. In Figures 1 and 1b of the drawings this plate is shown in the normal running position with the locking bar 52 engaging the prongs of the chuck and the plunger 69 in its forward position holding the shuttlecock base 46 against the stop 68. When the piercing and feather inserting operations on a positioned shuttlecock base have been completed the displacement of the cam 63a and the retraction of the member 55 results in a corresponding retraction of the sliding plate 58 and this movement in turn is applied to the plunger 69 which is consequently withdrawn.

As a result of the engagement between the parts 8 and 9 of the aforesaid dog clutch the shaft 11 is rotated. Mounted upon the outer end of this shaft 11 is a crank 74 to the crank pin of which is attached one end of a connecting rod 75. The opposite end of the rod connects with a sliding member 76 which is provided on its upper face with a pin 77. This pin engages with a cam slot 78 formed in a pivoted lever 79, the pivotal point of which is indicated at 80. The free end of this lever 79 is provided with a depending pin 81 which passes through a slot 82 in a guide 83 and engages with a plunger 84. This plunger is adapted to discharge the shuttlecock bases one at a time from the lower end of the hopper 46a and to insert the displaced shuttlecock base into the previously positioned chuck on the end of the arm 49a at the same time pushing out the previously positioned shuttlecock base which falls down a chute 85 into a suitable box or container, not shown.

On completion of a predetermined movement of the rod 75 a stop 86 on the extremity of the same and connected to the pivoted toothed sector 87 by means of the connection 87a (Fig. 3) in such a manner that as the rod 75 continues its movement it brings the teeth of the sector into mesh with the pinion 51. The pinion is thus made to rotate and to swing the arm 49a from the normal working position across the face of the spacing head to a position where the chuck comes opposite to the aforesaid plunger 84. In this position as abovementioned the completed shuttlecock base is ejected by the action of the forwardly moving plunger 84 and an interposed shuttlecock base from the hopper 46a. These movements all take place during one half of a revolution of the shaft 11. The other half of the revolution of this shaft 11 effects the return movement of the rod 75 and this in turn causes the arm 49a to be swung back to the operating position and the plunger 84 to be withdrawn to permit a further shuttlecock base from the hopper 46a to fall down to a position in advance of it and in readiness for its subsequent discharge.

During the time these movements have taken place the projection 67 on the Geneva wheel 13 has ridden over the projection 66 and by means of a spring 88 the lever 60 has returned to its normal position thus effecting withdrawal of the engaging parts 8 and 9 of the aforesaid dog clutch and the simultaneous movement into the locking position of the locking bar 52. Simultaneously with this movement the plunger 69 is moved outwards by the lever 70 thus forcing the newly positioned shuttlecock base against the stop 68. The shaft 14 now recommences to rotate owing to the inward movement of the cam 63a permitting engagement between two parts of the dog clutch 5a, one part of which is operatively connected to the toothed wheel 5 and the other part formed on or attached to the sleeve 63.

The necessary step by step motion of the spacing head 47 is imparted by means comprising a castellated or Geneva wheel 89 which is mounted upon and drives the shaft 48. This wheel 89 is in turn rotated by means of a pin wheel 90 which is rigidly mounted upon a shaft 91. This shaft 91 receives its rotation from a further shaft 92 by means comprising a double width pinion 93 carried by the shaft 92 and a single width pinion 93a carried by the shaft 91, the shaft 92 being driven from the shaft 17 through a universal joint 92a.

To afford the necessary time interval for the completion of the piercing and feather inserting operations at each pause of the wheel 89 it is necessary, in the present arrangement, to effect disengagement between the pin wheel 90 and the wheel 89 at every other revolution. This is effected by imparting a longitudinal movement to the shaft 91 by means of a lever 95 which is given the necessary rocking motion by interengagement between a pin or roller 96 carried by the lever 95 and a grooved cam 97 mounted upon the outer end of and rotating with the shaft 14, the necessary continuity of drive between the shafts 91 and 92 during this reciprocatory movement of the shaft 91 being permitted by the double width pinion 93.

Figure 6:
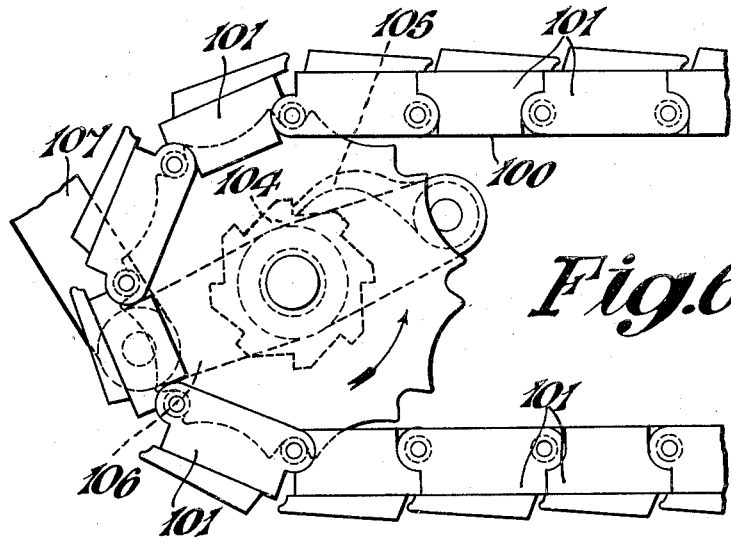
Figure 6 is an enlarged detail view of the feather feeding conveyor and its drive.
Figure 7:
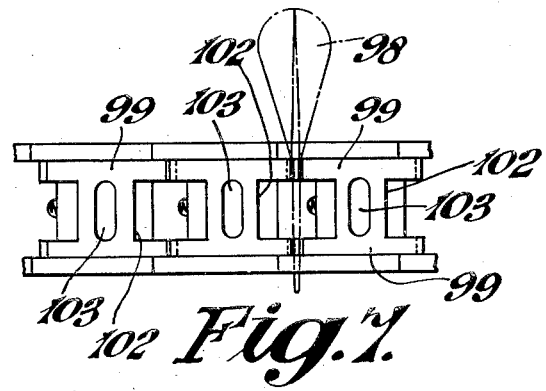
Figure 7 is a plan view of a portion of the conveyor feed showing a feather in position.
Figure 10:
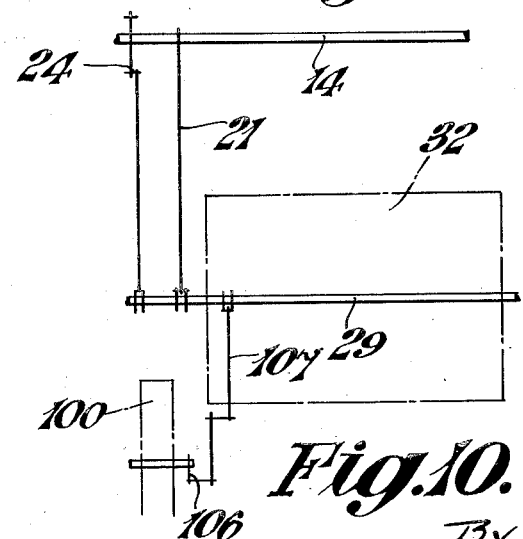
Figure 10 is a diagrammatic view of some of the driving connections hereafter to be described.

The feathers to be inserted, one of which is indicated at 98 in Figure 7, are inserted by the operator between opposing jaws 99 of a travelling conveyor 100. This conveyor in the example illustrated, see Fig. 6, is composed of a plurality of articulated side members or links 101 between which the jaws 99 are slidably positioned, suitable light springs, not shown, being interposed to hold the jaws in abutting engagement. At the opposing transverse edge of each jaw is formed a gap 102 which in pairs together form rectangular openings of a size sufficient to permit of the entrance of the feather grippers for the engagement and the removal of a positioned feather. These feathers are inserted, by the operator withdrawing each of the jaws 99 in turn for which purpose a finger groove 103 is provided in the upper face of each jaw.

This conveyor is moved with the required step by step motion by means of a ratchet 104 and an engaging pawl 105, said pawl being carried by one end of a rocking arm 106, such rocking motion being derived from the shaft 29 through a connecting link 107, see Fig. 2.

Figure 8:
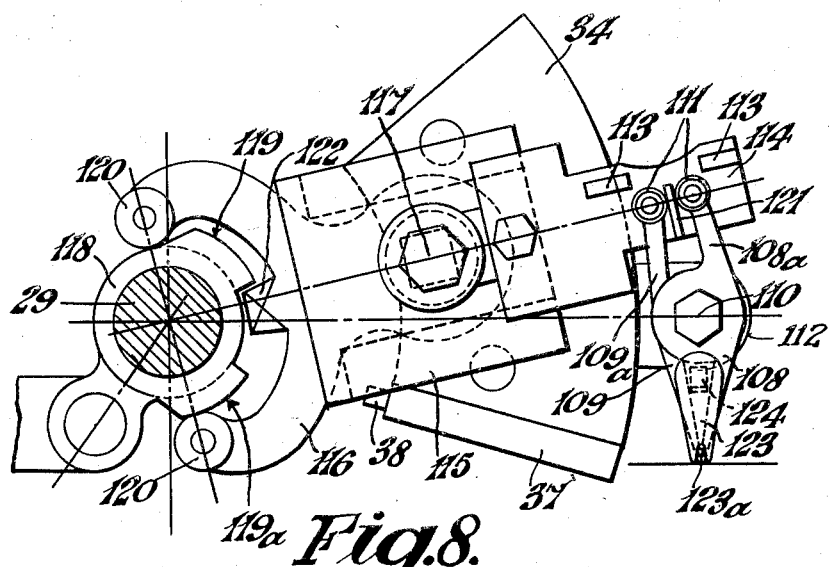
Figure 8 is an end view to an enlarged scale of the feather gripping device showing the same with the jaws in the closed position.
Figure 9:
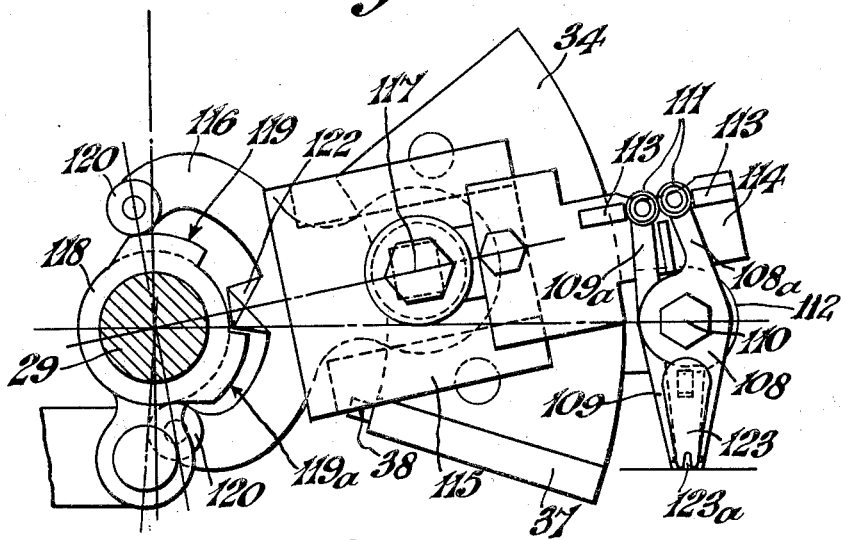
Figure 9 is a similar view but showing the jaws in the open position.

The feather gripper device is best illustrated in Figs. 8 and 9 and it comprises a pair of jaws 108 and 109 which are pivoted at 110 and are each provided on the oppoiste side of the pivot with an extension 108a and 109a respectively, having at their extremities rollers 111. The pivot pin 110 is carried by a boss 112 which is attached to and projects from the carrier 34, see Fig. 2. The gripper jaws are opened by closing the extensions 108a and 109a together and this is effected by a pair of bosses or protuberances 113 projecting from a plate 114, such bosses in consequence of the downward movement of the plate 114 engaging with the rollers 111. The plate 114 is attached to or forms part of a further plate 115 which in turn is attached to a pronged member 116 at 117 which constitutes a fulcrum about which the pronged member and the plate 114 turns. This turning movement is imparted by means of a cam 118 which is formed with two high portions 119 and 119a adapted to engage alternately with rollers 120 on the extremity of each arm of the pronged member.

When the jaws are in the open position shown in Fig. 9 the high part 119 is in engagement with its corresponding roller 120 whilst the opposite roller is in engagement with the low part of the cam. To close the jaws the cam is turned so as to bring the high part 119a into engagement with its co-operating roller thus causing the plate 114 to be elevated and to bring a narrow vertical projection or wedge 121 in between the rollers 111 thus forcing the extensions 108a and 109a apart. This movement of the cam, which is loosely mounted upon the shaft 29, is imparted by the connecting link 21 in consequence of co-operation between the forked end 21a thereof and the pins 20 on the pin wheel 19 mounted on shaft 14 see Figs. 1 and 2.

As the whole of the feather gripping device is movable with the carrier 34 it is necesasry, to ensure that the relative positions of the cam 118 and the pronged member 116 shall not be thereby disturbed, to provide means whereby the cam 118 is carried round with the other parts of the device. Such means in the present example comprises a projection 122 (Figs. 8 and 9) on the pronged member adapted to engage in turn with opposing faces on the high parts 119 and 119a of the cam. The width of the projection 122 is less than the distance between said opposing faces so as to permit of the required relative movement of the pronged member and the cam during the opening and closing movements of the gripper jaws 108 and 109.

On account of the flexibility of the feather stems it is advisable to support the same during insertion to prevent buckling. Further such supporting means are required to act also as a guide to counteract irregularities in straightness of the stems. In the example illustrated the device employed for these purposes comprises a flat plate member 123 rigidly mounted at right angles upon the outer end of a stem 124 which is slidably carried by a bracket 125 attached to the carrier 34. The lower end of the flat plate member 123 is formed with a gap 123a adapted to fit over or straddle a feather stem both during the time the feather is being picked up and inserted in the shuttlecock base.

To ensure that the member 123 shall always be in a position to straddle the feather stem near its extremity during each picking up operation a fixed cam 126 is provided against which the adjacent end of the stem 124 comes into contact when the carrier 34 is in the lowered or feather picking-up position. By this means the stem 124 is pushed outwards each time a fresh feather is picked up. During the insertion of the feather in the shuttlecock base the stem is pushed inwards again in consequence of the forward sliding motion of the carrier 34 bringing the member 123 into contact with the stop 68, such member consequently remaining stationary during the actual insertion of the feather stem which moves relatively therethrough. The member 123 being held against any rotational movement acts both as a guide to prevent lateral distortion of the feather stem during insertion and also as a corrective to align these stems which are naturally crooked.

The operation of the machine just described is as follows:—

Assuming that the hopper 46a contains a supply of shuttlecock bases and that the chuck on the end of the arm 49a is swung over to the position in readiness to receive a base from the said hopper, the machine is now started up by switching over the belt from the loose pulley 3 to the driving pulley 2. In this position the dog clutch 5a will be disengaged and the parts of the other dog clutch consisting of the portions 8 and 9 will be in engagement, the shaft 14 then being consequently disconnected from the drive. The shaft 11 will thereby be rotated and effect the withdrawal of the connecting rod 75. This movement causes the pin 77 to move in a straight line along the cam slot 78 thereby turning the pivoted lever 79 to the left about its pivot 80. This movement of the lever 79 effects retraction of the plunger 84, the movement of such plunger continuing until the forward end of the same is withdrawn from beneath the column of shuttlecock bases in the hopper 46a. When this position has been attained the lowest shuttlecock base falls down in front of the plunger which on its return movement serves to force the positioned shuttlecock base into the aforesaid chuck. On the remaining return stroke of the connecting rod 75 the arm 49a carrying the chuck is caused to swing over by interengagement between the toothed sector 87 and the pinion 51 until it returns to a position where the chuck and the shuttlecock base carried thereby is coincident with the axis of the spacing head 47. This movement of the arm 49a is effected during only a portion of the return movement of the connecting rod 75. By the time the return movement of the arm 49a has been completed the projection 67 completes its movement over the projection 66 and under the action of the spring 88 the cam 63 is returned to its normal position as shown in Fig. 1 thereby effecting re-engagement of the aforesaid dog clutch 5a, the disengagement of the parts 8 and 9 of the other dog clutch, thus disconnecting shaft 11 from the drive, and, by reason of the return movement of the lower end of the lever 60, effecting the inward movement of the locking bar 52 and the resulting locking of the chuck 49. Just previous to the locking of the chuck being completed and in consequence also of the return movement of the lower end of the lever 60 the sliding cam plate 58 is returned to its normal position thereby operating the lever 70 and causing the plunger 69 to move outwards to force the positioned shuttlecock base against the stop 68.

Now that the drive has been transferred from the shaft 11 to the shaft 14 the pin wheel 19 is caused to rotate and by means of the intermittent engagement between the pins 20 and the forked end 21a of the connecting rod 21 to swing the rocking member or quadrant 32 over until the carrier 33 is engaged by the lower end of the arm 41. This arm which is oscillated about its pivot 42 by the cam 18 serves to slide the carrier 33 and the piercing awl carried thereby inwards towards the shuttlecock base such movement being guided and controlled by the engagement between the guide pin 38 and the cam groove 39. This cam groove is so shaped as to accurately locate the piercing awl in relation to the shuttlecock base 46. When the piercing operation has been completed the carrier 33 is withdrawn by the return stroke of the arm 41 when the rocking member or quadrant 32 is returned by the connecting rod 21 to the opposite position thus bringing the other carrier 34 into the operating position, and at the same time causing the pin 44 on the arm 41 to engage between the parallel guides 45 on said carrier 34.

It should here be mentioned that when the quadrant 32 is swung over to bring the carrier 33 into the operating position the feather gripping device carried by the carrier 34 is caused, in the manner previously described, to engage one of the feathers in the travelling conveyor 100. Thus when the quadrant is swung back so as to bring the carrier 34 into the operating position the gripping device contains a feather in readiness to be inserted in the hole previously formed by the piercing awl 35. The insertion of this feather is effected in consequence of the inward movement of the carrier 34 by the arm 41, such feather as previously explained, being guided and supported during its insertion by the member 123.

During each piercing and feather inserting operation the spacing head 47 remains stationary. After a feather has been inserted the spacing head is moved round a further step by the Geneva wheel 89. These operations are repeated until all the feathers have been inserted, when the shaft 14 is once more disengaged from the drive and the shaft 11 engaged, the consequential operation causing the withdrawal of the locking bar 52, the swinging over of the arm 49a and the simultaneous discharge of the completed shuttlecock and the insertion of a fresh base.

It will be noted that the engagement between the projection 52a on the outer extremity of the locking bar and the member 54 is a free one so as to permit the locking bar to move round with the spacing head during the piercing and feather inserting operations and to interengage with the member 54 only at the completion of such operations.

It is to be understood that the machine just described represents but one embodiment of the present invention and may be modified without departing from the invention.

In the machine described in this specification it is the shuttlecock base which is rotated during the piercing and feather inserting operations, an arrangement which is preferred but of course, if desired, the shuttlecock base may be held stationary and the piercing and feather inserting devices rotated.

We claim:

1. Apparatus for use in the manufacture of shuttlecocks comprising a chuck for holding a shuttlecock base, means for feeding the base blanks singly to said chuck, means for intermittently rotating said chuck, means operating to pierce said shuttlecock base at each pause in the intermittent motion of the chuck for the reception of the feathers, means for picking up a feather and inserting the same in each said pierced hole, and means for discharging each feathered base from said chuck.

2. Apparatus for use in the manufacture of shuttlecocks comprising a chuck for holding a shuttlecock base, means for feeding the base blanks singly to said chuck, means for intermittently rotating said chuck, means operating to pierce said shuttlecock base at each pause in the intermittent motion of the chuck, gripper means movable in one direction to engage and pick up a feather and movable in another direction to insert the feather thus picked up in one of the pierced holes in the held shuttlecock base, and means for discharging each completely feathered base from said chuck.

3. Apparatus for use in the manufacture of shuttlecocks comprising an intermittently rotatable chuck for holding a shuttlecock base, means for feeding the base blanks singly to said chuck, means operating in alternation during pauses in the intermittent motion of the chuck to pierce a ring of holes in each held base blank and to insert feathers stem first, in each of said pierced holes, and means for discharging each completely feathered base from said chuck.

4. Apparatus for use in the manufacture of shuttlecocks comprising an intermittently rotatable chuck for holding a shuttlecock base, a head carrying means for piercing holes in each held base blank and gripper means for picking up and inserting a feather, stem first, in each pierced hole, said head being oscillatable so as in one direction of oscillation to move the piercing means into the piercing position and simultaneously to move the feather gripping means out of the inserting position and into the position for picking up a feather to be inserted and in the opposite direction of oscillation to move the piercing means out of the piercing position and simultaneously to move the feather gripping means with an engaged feather into the feather inserting position, means for independently moving the piercing means and the feather gripping means when in the piercing and inserting positions respectively towards and away from the held shuttlecock base to effect the piercing of the holes and the successive insertion therein of the feathers, and means for discharging each completely feathered base from said chuck.

5. In apparatus for use in the manufacture of shuttlecocks the combination with an intermittently rotatable chuck having associated with it means for feeding shuttlecock base blanks singly thereto and means for discharging each said base after insertion of the required number of feathers of means for piercing each held base with the required number of holes and further means for inserting the feathers, stem first, in each of said holes.

6. Apparatus for use in the manufacture of shuttlecocks comprising, in combination, a chuck for holding a shuttlecock base, means for feeding base blanks singly to said chuck, means for intermittently rotating said chuck, a piercing device movable in a direction towards and away from each held base for piercing the base during each pause in the intermittent motion of the chuck to provide a ring of spaced holes in said base and also movable at right angles to the first mentioned movement to shift the same laterally into and out of the piercing position, an intermittently movable conveyor to receive a plurality of feathers in spaced relationship to each other, gripper means also movable in two directions at right angles to each other for engaging each of the feathers in turn in said conveyor and for inserting the same singly in each hole of said ring of holes immediately following the formation of each of said holes and means for ejecting each completely feathered base from said chuck.

SOLOMON HIRSH SIEFF.
GEORGE WILLIAM BATTLE.